3,376,733
VIBRATION ANALYZER
Philip K. Trimble, Rochester, and Edgar D. Walton, Detroit, Mich., assignors to General Motors Corporation, Detroit, Mich., a corporation of Delaware
Continuation of application Ser. No. 113,341, May 29, 1961. This application May 12, 1966, Ser. No. 549,732
19 Claims. (Cl. 73—71.4)

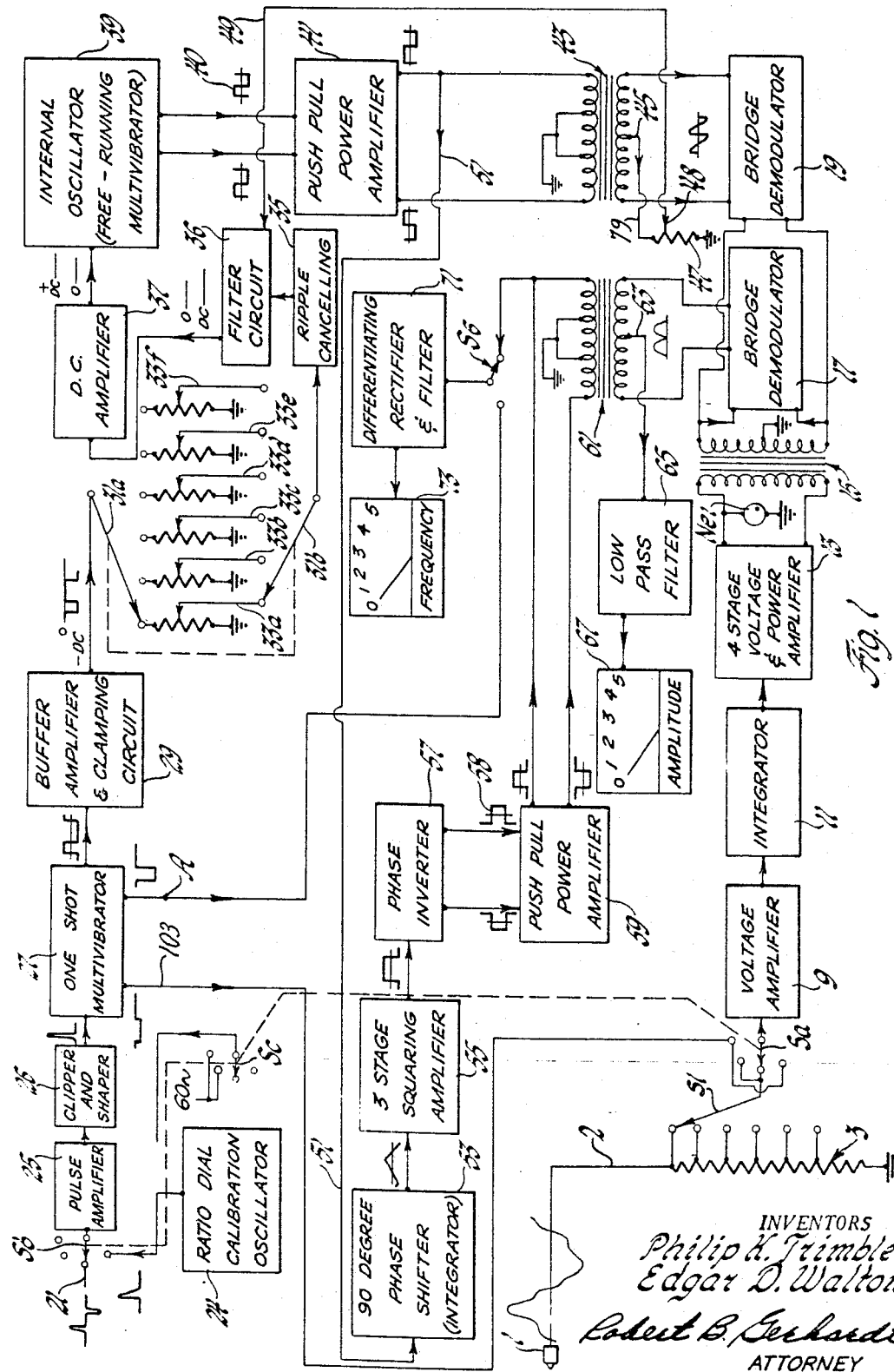

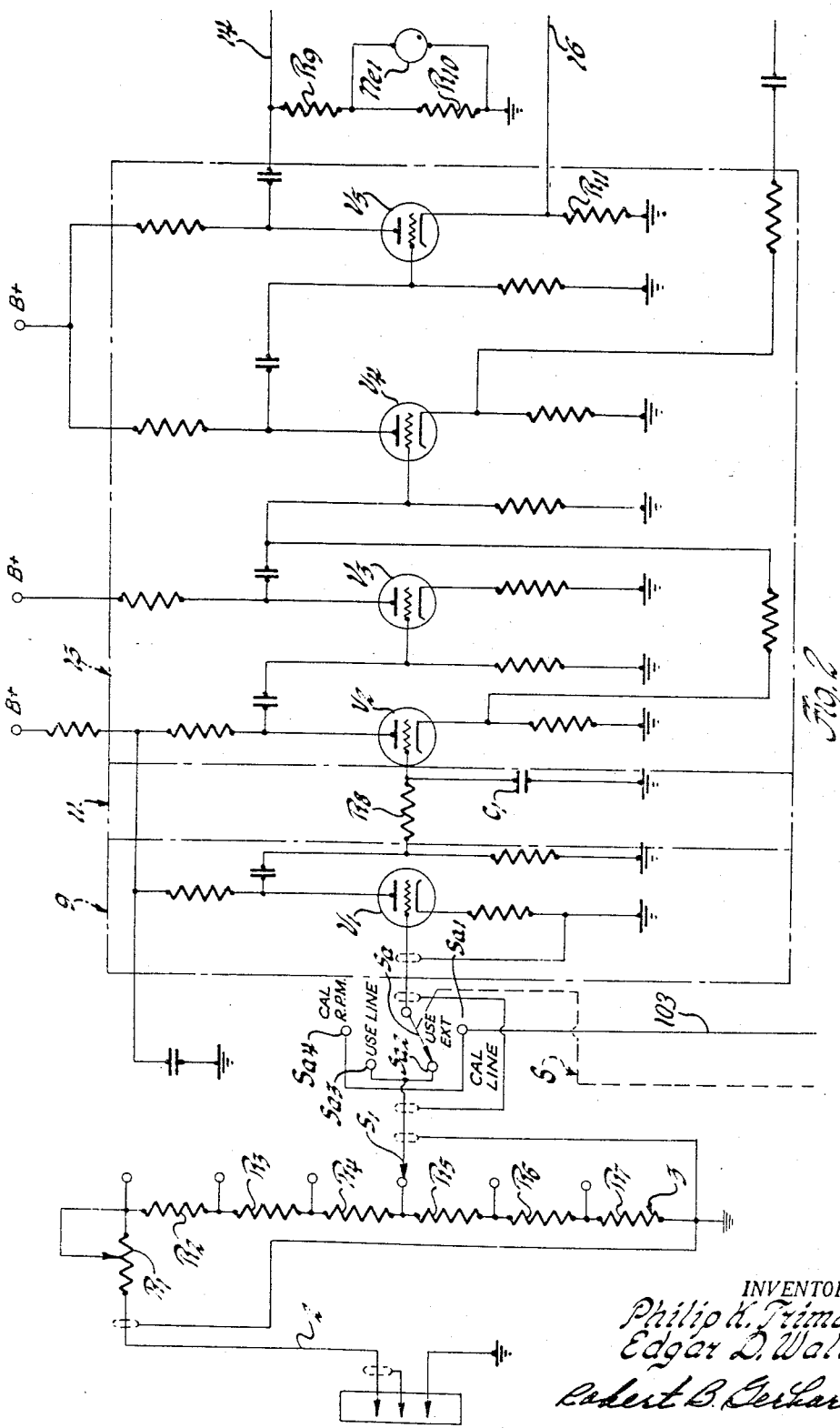

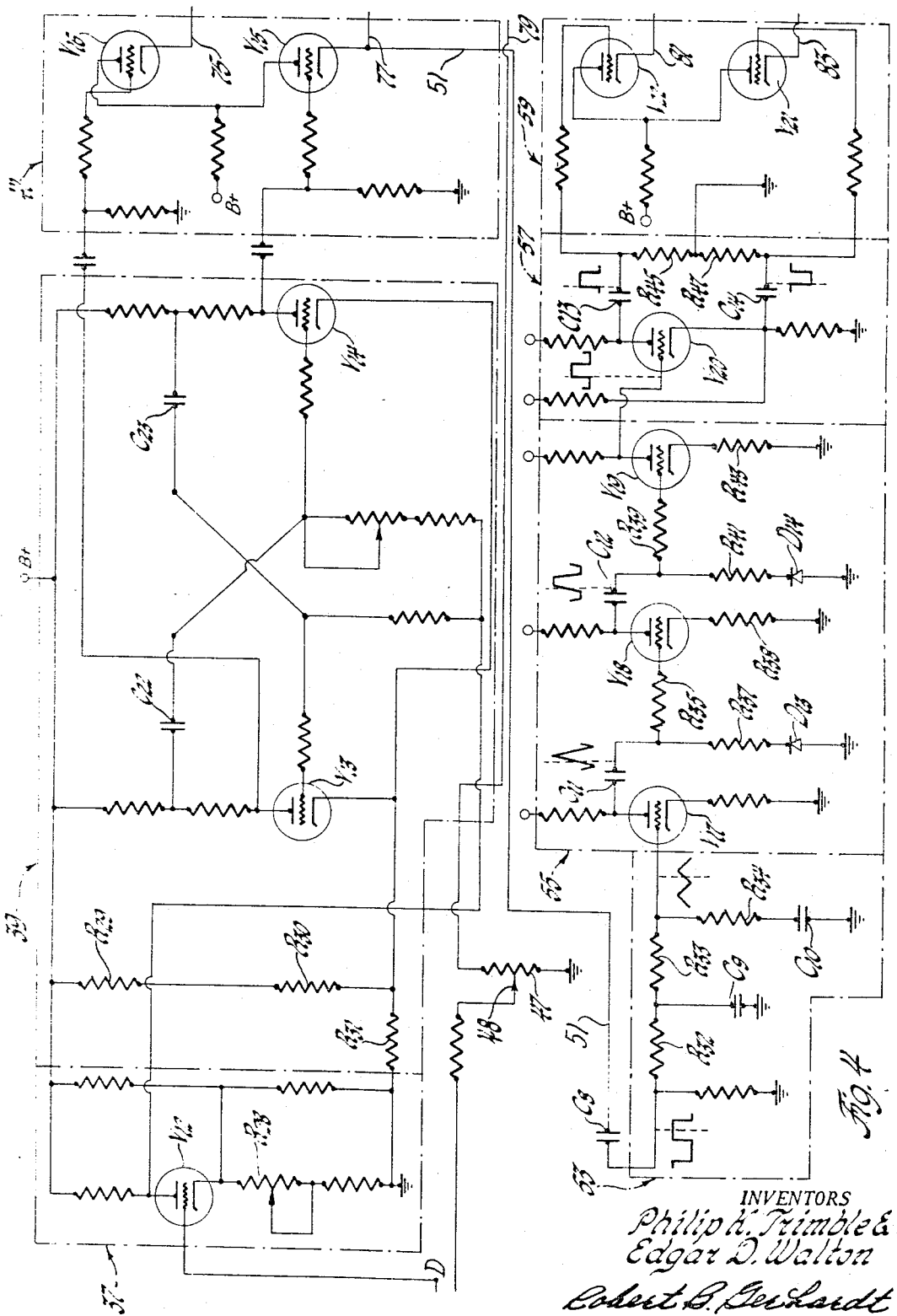

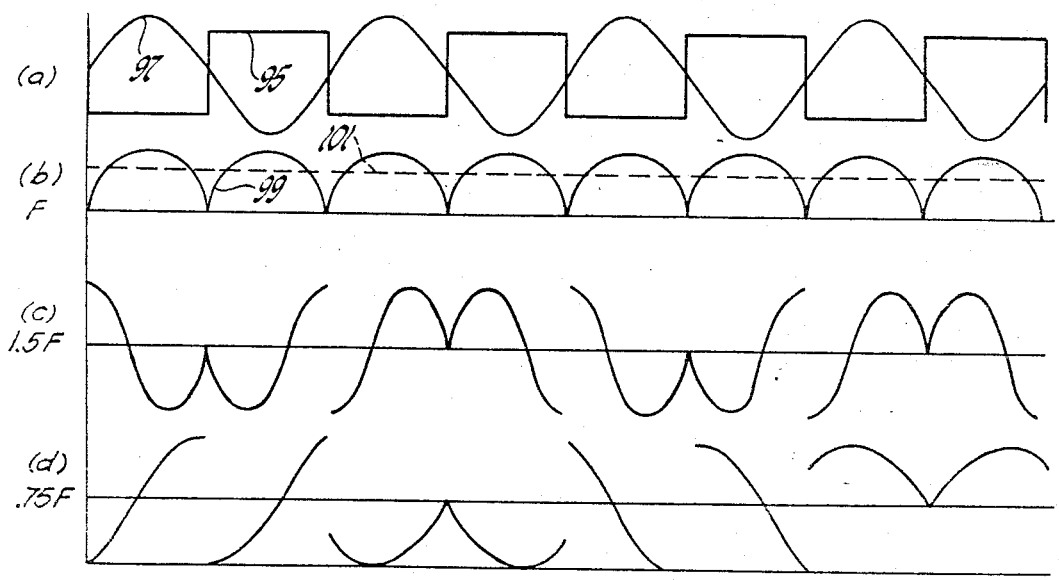
Fig. 7
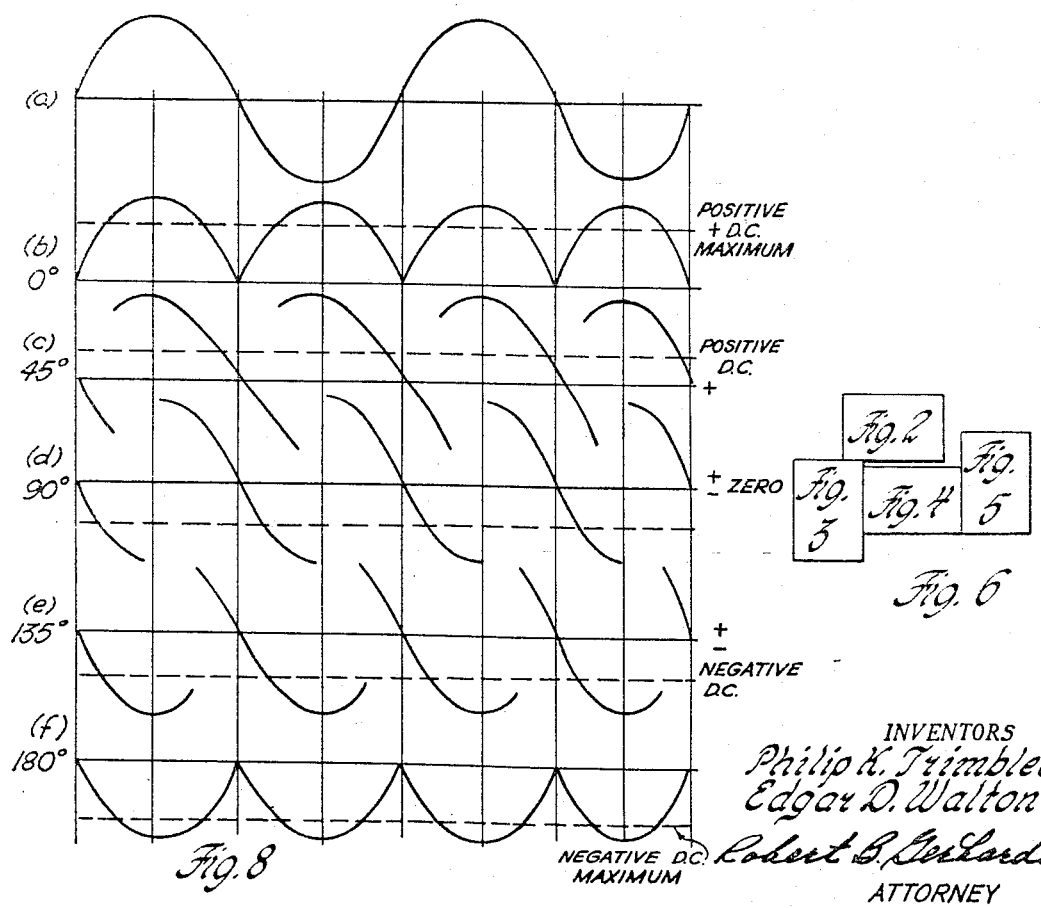
Fig. 8
Fig. 6
INVENTORS
Philip K. Trimble &
Edgar D. Walton
Robert B. Gerhardt
ATTORNEY

ABSTRACT OF THE DISCLOSURE

A vibration analyzer for isolating and evaluating the vibrations from various individual components of a rotating assembly, such as an internal combustion engine having several accessories, each driven at a speed different from engine speed. One pickup senses the vibrations of the assembly and develops a complex wave-shaped signal having the frequency components to be analyzed. Another pickup develops a reference signal of the same frequency as the speed of the assembly. A portion of the reference signal, selected according to the relation of the speed of the component to the assembly speed, drives a variable frequency oscillator. This variable frequency oscillator develops a square wave-shaped output of a frequency approximate that of the selected component and is mixed by synchronous rectification with the complex signal for filtering purposes. The resultant synchronously rectified signal is fed back to the oscillator to alter the phase and the frequency thereof so that the oscillator will lock-in on the frequency of the selected component, at which time the square wave output from the oscillator and the complex signal will be 90° out of phase and the synchronously rectified signal will be nulled. The oscillator output is also phase shifted 90° to again synchronously rectify the complex signal and develop therefrom an output that is utilized for amplitude and frequency readout purposes.

This is a continuation of application Ser. No. 113,341, filed May 29, 1961, now abandoned.

*Specification*

This invention relates to frequency analyzers and more particularly to vibration analyzers capable of determining the amplitude and frequency of various frequency components of complex vibration signals.

In order to analyze complex vibrations produced by rotating parts, especially assemblies of connected accessories and parts rotating at different speeds, it is necessary to separate out the vibration frequency components caused by the individual accessories and parts. This frequency separation requires the use of a relatively narrow bandwidth filter to prevent measurement of vibrations caused by parts other than the particular part being checked. In the case of an automotive engine and accessories, the cam shaft runs at half the crankshaft speed while the generator may run at 2.3 times the crankshaft speed. Other members such as the generator, power steering pump and fan operate at still other speeds. For example in a typical installation the fan may run at 0.9 times crankshaft speed. In the case of an engine operating at 1200 r.p.m. or 20 cycles per second, the fan will operate at 1080 r.p.m. or 18 cycles per second. Since the vibrations caused by the crankshaft and fan operating at these speeds are only two cycles apart, conventional filters do not have the selectivity to effectively separate such vibrations.

An additional problem may exist in analyzing complex vibrations since the vibrations of various parts may be objectionable only at certain speeds. A practical usable vibration analyzer must therefore be capable of tracking or analyzing the various vibration components throughout the full speed range of the engine and associated members. Narrow band pass filters designed to pass only a single narrow frequency band generally cannot function throughout the wide range necessary to analyze the vibrations in an installation such as an automotive or aircraft engine. While it has been suggested to use heterodyne analyzers using intermediate frequency filters, these have limitations both as to the minimum bandwidth that can be effectively filtered and as to the minimum frequency that can be effectively filtered. Heterodyne filters usually require mechanical tuning arrangements, such as variable capacitors, that require expensive and heavy servo motors to tune the same for automatic tracking control. Furthermore, heterodyne filters usually require expert calibration and use in order to effectively use the analyzer to analyze two frequencies quite close together, for example within two cycles of each other.

One method of providing highly selective filtering of complex waveforms produced by transducers connected to rotating members has been developed using synchronous controlled rectifiers such as mechanical choppers or even more effectively by synchronous controlled rectifier bridges. By synchronizing the rectifiers to the rotation of the part being checked, the synchronous rectifier can be used to measure only the vibrations occurring at the same frequency as the rotational frequency of the part whose vibrations are being analyzed. An example of the use of such filters is shown in U.S. Patent 2,787,907 in the name of William F. King and entitled "Crankshaft Balancing Machine."

It would be desirable to further this type of analysis by being able to synchronize the controlled rectifier filters with the rotation of parts and accessories other than the main rotating part without having to provide separate synchronizing or reference signal connections to these parts. It would furthermore be desirable to be able to provide a vibration analyzer that would be able to selectively indicate both the magnitude and frequency of vibration of the various rotating members of a group of connected parts, as an engine and its accessories, merely by switching a selector switch from one position to another.

It is therefore an object of this invention to provide a vibration analyzer that will effectively measure the magnitude of vibration, both relative and absolute, as well as the frequency of a plurality of rotating members operating at various and different speeds and together producing a complex vibration.

It is a further object to provide such an analyzer that will automatically track these vibrations as their frequencies change throughout a relatively large range.

It is still a further object to provide an analyzer wherein a single vibration pickup and signal reference or synchronizing pickup can be attached at a single point to a complex machine having a plurality of rotating parts operating at varying and different speeds and capable of independently and selectively measuring the vibrations caused by unbalance in each part.

Still another object is to provide such an analyzer that will effectively analyze the vibrations caused by parts operating at very nearly the same speed.

These and other objects and advantages will be apparent to those skilled in the art from the following description and drawings which illustrate one form the invention may take and in which:

FIGURE 1 is a block diagram illustration of a complete vibration analyzer;

FIGURE 2 is a circuit diagram of a portion of the electrical and electronic parts of the analyzer of FIGURE 1;

FIGURE 3 shows a further portion of the circuit diagram;

FIGURE 4 shows still another portion of the circuit diagram;

FIGURE 6 shows how the FIGURES 2 to 5 inclusive may be arranged to form a complete circuit diagram of the apparatus;

FIGURE 7 illustrates how a particular frequency is separated from two other frequencies by the synchronous rectifiers; and FIGURE 8 illustrates how the synchronous rectifiers provide an output signal to control the oscillator to maintain a correct phase relationship.

Figure 5:
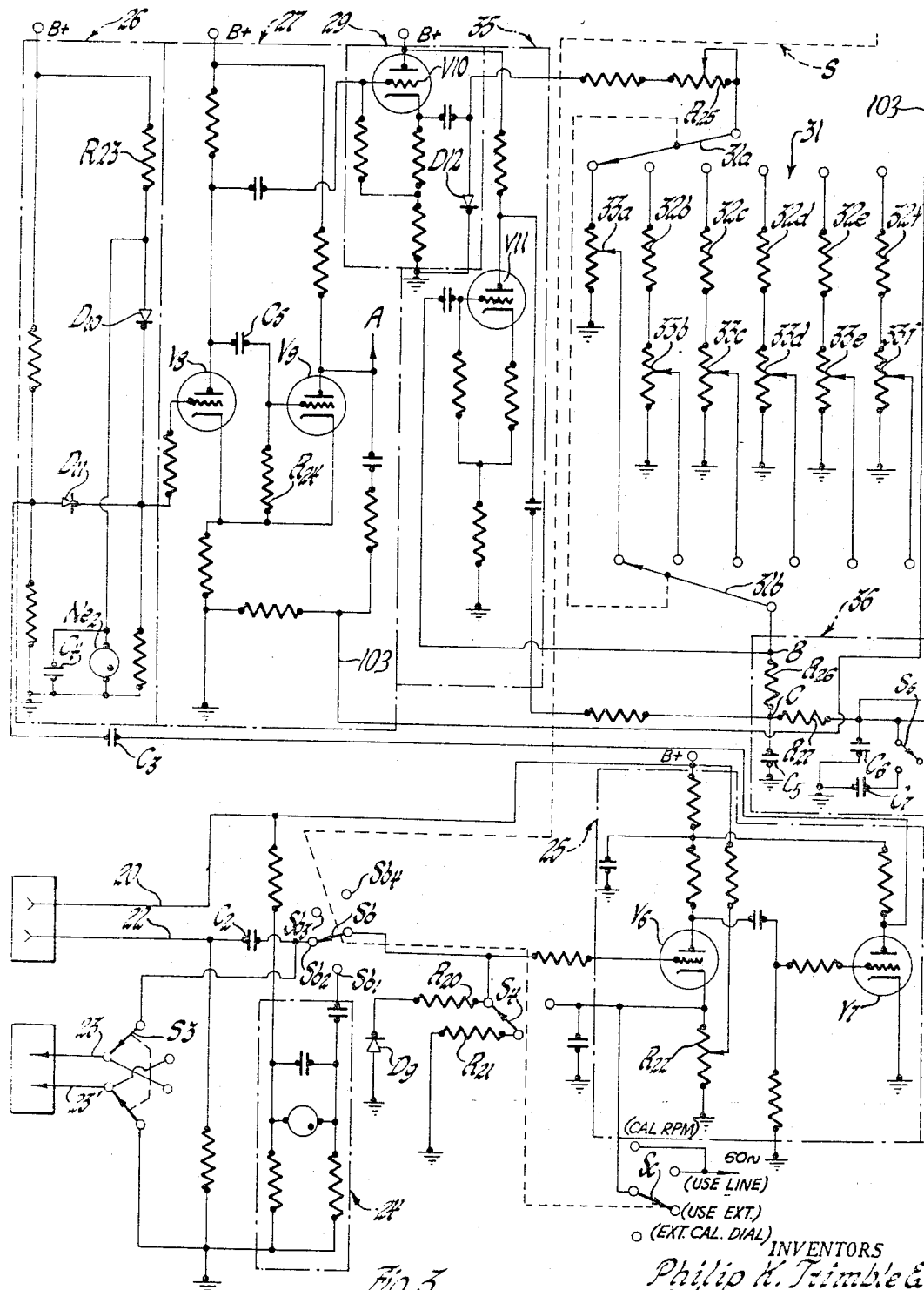
FIGURE 5 shows another portion of the circuit diagram.
Figure 5:
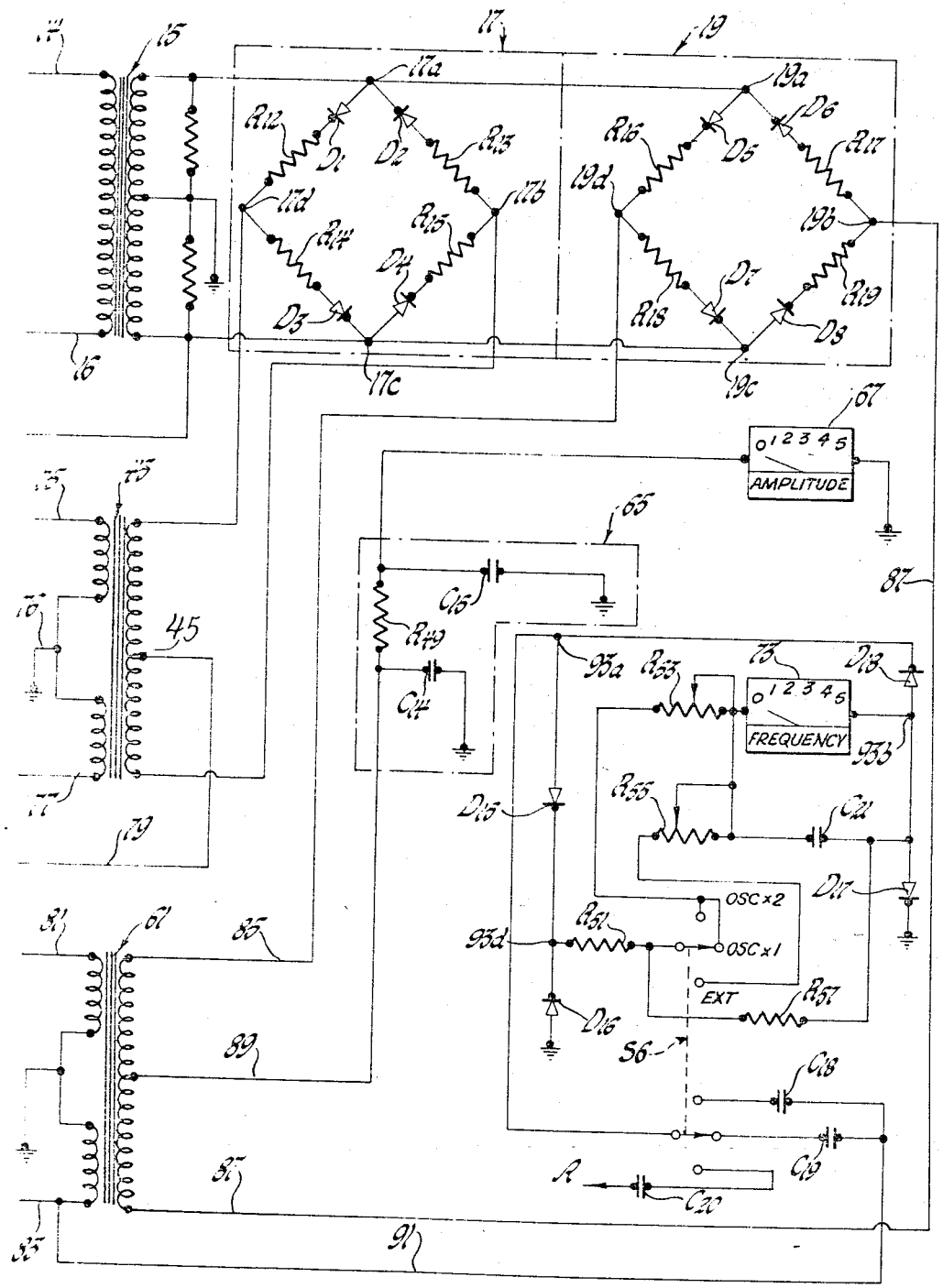

Briefly the invention includes an amplifier that amplifies a complex electrical signal produced by a vibration pickup connected to the mechanism to be analyzed, such as an internal combustion engine. The amplified vibration signal is then filtered by a pair of bridge type synchronous rectifiers. A sync signal or pulse is derived form the rotation of one part of the apparatus being measured, such as one pulse per revolution of the crankshaft on the engine. This sync pulse is used to form a rectangular wave signal having a fixed pulse duration and having the same frequency as the sync pulse. The rectangular wave signal is rectified and filtered to provide a main DC signal having an amplitude proportional to the frequency of the sync or reference pulse. A variable and determinable portion of this DC is used to control the frequency output of a first square wave generator whose output is amplified and then used to control one of the synchronous rectifiers. A portion of the output from this synchronous rectifier is fed back to the DC control of the oscillator and varies the phase of oscillator square wave output until the rectifier output is zero. This occurs when the first square wave is 90 degrees out of phase with the component of the vibration signal having the same frequency as the sync signal. The apparatus is calibrated so that the frequency of the square wave bears the same ratio to the sync frequency as the speed of the part producing the vibration component does to the speed of the part providing the sync pulse.

The output of the square wave generator is also used to form a second square wave having the same frequency as the first but 90 degrees out of phase with the same. This 90 degrees phase shifted square wave is used to control the second synchronous rectifier connected to the amplified complex vibration signal. The average DC value of the output of the second rectifier is indicated on an amplitude meter which can be used to indicate absolute or relative magnitude of the vibrations of the engine occurring at the frequency of the square wave. A second meter is used to selectively indicate either the frequency of the 90 degrees phase shifted square wave which represents the frequency of the vibration whose amplitude is indicated on the amplitude meter, or alternatively, the frequency of the rectangular wave which represents the frequency of the sync pulse or speed of rotation of the reference or sync member such as the crankshaft.

By switching between the plurality of fixed and calibrated voltage dividers, the percentage or portion of the main DC signal that is fed to the DC controlled oscillator can be varied to change the ratio of the measured vibration frequency to the reference frequency. For example if a certain main DC voltage drive of the controlled oscillator produces an output having the same frequency as the sync frequency, then if 90 percent of this certain DC voltage is fed to the oscillator, the frequency of the measured vibration would be 90% of the reference frequency. In the case of a cooling fan rotating at 90% of the speed or r.p.m. of the engine crankshaft, and where no other part or accessory operates at this 90% speed, then only the vibrations produced by the fan will be indicated on the amplitude meter when a 90% ratio drive of the oscillator is established. Also by providing a continuously variable and determinable voltage divider control of the percentage of the main DC fed to the oscillator, the complex vibration signal can be fully analyzed by scanning through all speed ratios from a small fraction of the engine speed to a multiple of that speed.

Referring now to FIGURE 1 which shows a complete vibration analyzer in block diagram form, it will be seen that theer is provided a vibration pickup 1 which depending on the form thereof is connected to or placed in proximity with a stationary part of the mechanism whose vibrations are to be analyzed. This pickup may be any type of transducer such as displacement, velocity, accelerometer, microphone, etc., however, in the specific example shown a velocity type pickup would be used. The pickup 1 produces a complex electrical signal as shown having various sinusoidal components. The pickup 1 is connected through a lead 2 to an attenuating resistance network 3 having a plurality of output taps to which a displacement lever switch S–1 can be selectively connected. The complex vibration signal then passes through contacts on the deck *a* of a three deck four position switch S to a voltage amplifier 9. The switch S also has decks *b* and *c*. The output of the voltage amplifier 9 is connected through an integrator circuit 11 which changes the characteristics of the velocity responsive vibration signal to that representing displacement. The signal is then fed to a four stage voltage and power amplifier 13. The output of amplifier 13 is fed into the input primary of a transformer 15 which has its output secondary connected in parallel to a pair of bridge demodulators 17 and 19.

A sync signal or reference pulse, obtained from any suitable source providing a signal or pulse having a frequency equal to the rotational frequency of the main mechanism, is applied at an input 21 at deck *b* of the switch S. This reference or sync signal may be obtained from any suitable source such as the engine ignition, photo-electrical pickup, magnetic pickup, etc. The reference signal is fed through an amplifier 25 and then to a clipping and shaping network 26 which provides a one per revolution sharp positive pulse for each revolution of the mechanism. This sharp pulse is fed into and acts to control a one shot multivibrator 27 that generates a rectangular wave having a frequency equal to the frequency of the sync pulse and having a fixed pulse duration. This rectangular wave from the output of the one shot multivibrator 27 is then fed into a buffer amplifier and clamping circuit 29 which provides a negative DC output signal having a value that varies proportionally with changes in the frequency of the rectangular wave pulses. The DC output of the circuit 29 is connected to six position switch 31a–31b. Movable contacts 31a connects the DC to one end of a plurality of potentiometers 33a–33f, inclusive.

The other ends of the potentiometers 33 are connected to ground. The switch 31a–31b has a second movable contact 31b, movable in unison with the contact 31a, that connects the adjustable tap output of the selected potentiometer 33 to a ripple cancelling circuit 35. The potentiometers 33a through 33f thus act a voltage dividers to supply a portion or percentage of the DC output from the circuit 29 to the movable contact 31b and circuit 35. The signal from the ripple cancelling circuit 35 is connected to a filter circuit 36 whose output is a pure DC voltage.

This DC voltage which is still ranged between 0 and a maximum negative value, is fed into a fixed ratio DC amplifier 37 the output of which is connected to an internal oscillator 39 which may be a frequency controlled free running multivibrator. The oscillator 39 provides a pair of phase inverted square wave signals having a frequency proportional to the input DC signal. The square waves produced by the oscillator drive a push-pull amplifier 41 whose output is connected to a transformer 43 having a secondary connected across the bridge demodulator 19. A center tap 45 of the secondary winding of the transformer 43 is connected to a voltage divider potentiometer 47 whose movable center tap 48 is connected through lead 49 to feed back a portion of the bridge output, if any, to the filter circuit 36 wherein it is combined with the output from DC potentiometer 33.

The output from the push-pull amplifier 41 is also connected by a lead 51 to a 90 degree phase shifter network 53 whose output is connected to a three stage squaring amplifier 55. The output from 55 in turn is connected to a phase inverter 57. The output of the phase inverter 57 is a square wave having the same frequency as the square wave output of the amplifier 41 but displaced 90 degrees in phase therefrom. This 90 degrees displaced square wave is amplified by a push-pull amplifier 59, the output of which is connected to the primary of an output transformer 61. The secondary winding of the transformer 61 is connected across the bridge demodulator 17. A center tap 63 on the secondary of 61 is connected through a low pass filter 65 to an amplitude meter 67.

The 90 degrees phase shifted square wave output from the amplifier 59 can also be connected through a switch S–6 to a differentiating full wave rectifying and filter circuit 71 feeding an r.p.m. or frequency meter 73. The switch S–6 can also be positioned to connect the rectangular wave output of the one shot multivibrator 27 to the full wave rectifier and filter circuit 71.

FIGURES 2, 3, 4 and 5 together show the complete schematic circuit of the apparatus shown in block diagram form in FIGURE 1. FIGURE 6 illustrates the relationship of FIGURES 2, 3, 4 and 5 to each other to form a complete circuit. Dashed boxes in FIGURES 2 to 5 are used to indicate the blocks in FIGURE 1 and corresponding reference numbers are used to indicate the complete groups of components making up the blocks of FIGURE 1.

As seen in FIGURE 2 the signal from the vibration pickup is connected to an input lead 2. The voltage dividing or displacement level resistor generally indicated 3 consists of a series of resistors $R_1$ to $R_7$ connected between the input 2 and the apparatus electrical ground. $R_1$ is a variable resistor that is used to calibrate the input to provide full scale meter deflection for various vibration displacements. Switch $S_1$ connects the various taps between the resistors $R_2$ to $R_7$ to contacts $Sa_2$ and $Sa_3$ of a three deck, four position switch S. The movable contact $Sa$ is connected directly to a preamplifier 9, specifically to the control grid of a triode amplifier tube $V_1$.

It should be noted that in the circuit diagram of FIGURES 2 to 5 the tube filaments and their supply voltages are not shown nor is the DC B plus supply. The plate output from $V_1$ is connected to an integrator circuit 11 consisting of a resistor $R_8$ and capacitor $C_1$. This integrator network, as indicated previously in the description of FIGURE 1, changes the velocity responsive vibration signal from pickup 1 to a displacement responsive signal. If an acceleration responsive pickup were used, a second integrator network would be provided to change the acceleration signal to a velocity signal which would be changed to a displacement signal by the network 11. The output from the integrator network 11 at the junction between $R_8$ and $C_1$ is fed into a four stage voltage and power amplifier generally indicated 13 and consisting of capacity coupled amplifier triodes $V_2$, $V_3$, $V_4$ and $V_5$.

Resistors $R_9$ and $R_{10}$ provide a voltage divider to place a portion of the output of $V_5$ across a neon tube $Ne_1$ which functions as an amplifier over driven signal light. During use of the apparatus the input displacement selector switch $S_1$ is adjusted to the position wherein $Ne_1$ does not light which indicates distortionless operation of amplifier 13. Output leads 14 and 16 connect the signal output from the final amplifier tube $V_5$ developed between the plate thereof and cathode resistor $R_{11}$ to the primary winding of transformer 15, FIGURE 5. The secondary winding of transformer 15 has a grounded center tap while the ends thereof are connected to opposite junction terminals $17a$ and $17c$ of a diode bridge circuit 17 and terminals $19a$ and $19c$ of bridge 19 as seen in FIGURE 5.

The bridge circuit 17 comprises series connected diodes $D_1$, $D_2$, $D_3$ and $D_4$ with current limiting resistors $R_{12}$, $R_{13}$, $R_{14}$ and $R_{15}$ in series with the diodes. The second bridge circuit 19 is identical with bridge 17 and comprises diodes $D_5$, $D_6$, $D_7$ and $D_8$ as well as resistors $R_{16}$, $R_{17}$, $R_{18}$ and $R_{19}$. The bridges 17 and 19, in combination with transformers 43 and 61 respectively, each comprises a synchronous controlled demodulator or rectifier circuit. The synchronizing or controlling signals for the bridges are applied at the pairs of opposite junctions $17b$–$17d$ and $19b$–$19d$.

Referring now to FIGURE 3, it will be seen that there is provided two sync or reference inputs to the analyzer. The first input includes leads 20 and 22 that are suitable for connection to a photocell pickup requiring a high voltage such as present on lead 20, for operation. The reference pulse as supplied by the photocell appearing in lead 22 is coupled to contact $Sb_2$ of switch S by a capacitor $C_2$. The second sync input comprising leads 23 and 23' are for use with pickups providing self generated pulses such as those obtained from magnetic, spark or ignition sync pickups. A reversing switch $S_3$ connects either input lead 23 or 23' to the contact $Sb_2$ and the other of the input leads to the analyzer electrical ground.

With the movable contact $Sb$ in the position shown any sync signal applied to either sync input will be coupled to the control grid of triode $V_6$. A circuit including resistors $R_{20}$ and $R_{21}$ and diode $D_9$ and controlled by a switch $S_4$ adjusts the input impedance of the sync circuit for high or low level sync pickups. $V_6$ along with triode $V_7$ form a two stage sync pulse amplifier 25. The cut off level of amplifier 25 can be varied by adjusting the cathode potentiometer $R_{22}$.

The amplified sync pulse from amplifier 25 is coupled through capacitor $C_3$ to a clipping and shaping network 26. A neon tube $Ne_2$, capacitor $C_4$ and voltage dropping resistor $R_{23}$ serve to establish a regulated voltage at the junction between $R_{23}$ and a diode $D_{10}$. Diode $D_{10}$ and a second diode $D_{11}$ allow only positive trigger sync pulses to pass to the grid of a triode $V_8$. $V_8$ and a second triode $V_9$ together form a one shot multivibrator network 27. $C_5$ and $R_{24}$ form a time constant control of the positive output pulse emitted by $V_9$ after a positive pulse at the grid of $V_8$ causes the same to conduct. The one shot multivibrator 27 therefore produces an on-off rectangular wave having a fixed duration positive pulse occurring at the same frequency as the triggering input pulse from the clipping network 26. The fixed time duration pulse produced at the plate of $V_9$ is available at point A for frequency measurement by a meter as shown in FIGURE 5, such measurement being described later.

The voltage on the plate of $V_8$ of multivibrator 27 changes with that on the plate of $V_9$. As seen in FIGURE 2 the plate of $V_8$ is capacity coupled to the grid of a triode $V_{10}$ arranged in a reduced grid bias cathode follower amplifier circuit 29. A negative clamping diode $D_{12}$ limits the cathode resistor output of 29 to a negative value. This output is connected through a calibration potentiometer $R_{25}$ to one movable contact 31a of a two deck six position switch 31a–31b. The contact 31a in its various positions feeds the now all negative rectangular wave from the amplifier 29 to any of a series of resistors 32b to 32f which are in series with adjustable resistors 33b to 33f respectively. Switch 31a–31b also can be positioned to feed the reference or sync wave to potentiometer 33a. The adjustable taps of potentiometers 33a to 33f are arranged on the second deck of switch 31a–31b where movable contact 31b will connect the same to point B. The potentiometer 33a which may be a ten turn calibrated dial type potentiometer which directly divides the voltage output from 29 depending on the setting of the dial. Likewise the potentiometers 33b to 33f and series connected resistors 32b to 32f provide for adjustable, but normally fixed, voltage division of that output.

The clamped wave form at point B is filtered by an RC filter 36, including capacitors $C_5$ and $C_6$ and resistor $R_{27}$. A switch $S_5$ can be actuated to insert additional filtering by $C_7$ and is used where there are two vibrations having almost the same frequency.

The clamped signal at point B is fed back into a ripple cancelling circuit 35 including $V_{11}$ which inverts any ripple. The inverted ripple is fed back into the main sync circuit at point C where it acts to cancel original ripple.

The filtered and divided signal which is now a relatively pure negative DC voltage at point D, is directly coupled into a DC amplifier 37 circuit including triode $V_{12}$, as seen in FIGURE 4. The output level of $V_{12}$ can be adjusted by a variable cathode resistor $R_{23}$. The amplified and now positive DC from the plate of $V_{12}$ is connected to a free running multivibrator oscillator 39 including triodes $V_{13}$ and $V_{14}$. The frequency of the square wave output of the multivibrator, as it appears on the plates of $V_{13}$ and $V_{14}$, is varied by the DC output from $V_{12}$ which acts to change the grid bias on the multivibrator tubes $V_{13}$ and $V_{14}$. The cathodes of $V_{13}$ and $V_{14}$ are normally positively biased by a voltage divider including resistors $R_{29}$, $R_{30}$ and $R_{31}$. The variable DC from DC amplifier $V_{12}$ changes the bias on the grids of $V_{13}$ and $V_{14}$ and hence the rate at which the cross coupling capacitors $C_{22}$ and $C_{23}$ charge. This in turn changes the frequency at which the multivibrator runs and hence the frequency of the square wave outputs at the plates of $V_{13}$ and $V_{14}$.

The frequency controlled square wave outputs from the plates of tubes $V_{13}$ and $V_{14}$ are capacity coupled into a cathode follower push-pull amplifier 41 including triodes $V_{15}$ and $V_{16}$. Since the square wave from $V_{13}$ is displaced 180 degrees from the form $V_{14}$, no inverter circuit is necessary to drive the push-pull amplifier 41. The tubes $V_{15}$ and $V_{16}$ have their cathodes connected via leads 75 and 77 to opposite ends of the primary winding of a transformer 43, FIGURE 5. This primary has its center tap 76 directly connected to ground as shown in FIGURE 5. The secondary winding of transformer 43 is connected across junction points 17b and 17d of the rectifier bridge 17. The center tap of this secondary is connected by lead 79 to one end of the phase lock potentiometer 47.

The square wave output at the cathode of $V_{15}$, FIGURE 4, is also connected by lead 51 through a coupling capacitor $C_8$ to a two step integrator network 53 comprising a first integrator including resistor $R_{32}$ and capacitor $C_9$ and a second integrator including register $R_{33}$ and capacitor $C_{10}$ in series with resistor $R_{34}$. $R_{32}$ and $C_9$ are proportioned to provide a substantial phase shift even at low frequencies while $R_{33}$, $R_{34}$ and $C_{10}$ provide a small but fairly constant phase shift. The total network transforms the square wave from $C_8$ to a 90 degree phase shifted triangular wave that is fed to the grid of a linear amplifier including tube $V_{17}$. The amplified triangular wave output from $V_{17}$ is capacity coupled through $C_{11}$ to the grid of triode $V_{18}$ through a grid limiter resistor $R_{35}$. $V_{18}$ is the first of two overdriven amplifiers for transforming the triangular wave to a square wave by conventional grid and cutoff limiting action. A resistor $R_{37}$, having the same value as the grid limiter resistor $R_{35}$, is in series with a diode $D_{13}$ to provide a discharge impedance from $C_{11}$, during negative operation of the grid of $V_{18}$, equal to the charging impedance of $C_{11}$ during positive or grid current operation. This makes the output or load impedance on $V_{17}$ remain constant during a full cycle and enables the squared wave produced at the plate of $V_{18}$ to have equal positive and negative swings.

The partially squared wave from $V_{17}$ is coupled through $C_{12}$ to a second overdriven amplifier. Grid resistor $R_{39}$ discharge resistor $R_{41}$ and diode $D_{14}$ perform the same function as $R_{35}$, $R_{37}$ and $D_{13}$ respectively. The square wave output at the plate of $V_{19}$ is fed to the grid of $V_{20}$ forming a single tube paraphase amplifier 57. The phase inverter outputs from the plate and cathode of $V_{20}$ are coupled through $C_{13}$ and $C_{14}$ to the grids of tubes $V_{21}$ and $V_{22}$ which form a push-pull cathode follower amplifier 59 identical with amplifier 41. The push-pull output from $V_{21}$ and $V_{22}$ is applied through leads 81 and 83 to a center tapped transformer 61, FIGURE 5, similar to transformer 43. The center tap of the primary of transformer 61 is grounded as shown.

The secondary winding of transformer 61 is connected through leads 85 and 87 to the opposite junction points 19d and 19b of the rectifier bridge 19. The center tap of the secondary winding of transformer 61 is connected by a lead 89 to a low pass filter circuit 65 including $C_{14}$, $C_{15}$ and $R_{49}$. The output from filter 65 is connected to one side of a DC amplitude meter 67 the other side of which is grounded as shown.

One end of the primary winding of transformer 61 is connected through lead 91 to a pair of capacitors $C_{18}$ and $C_{19}$, the opposite ends of which are connected to two stationary contacts of a three position double pole switch $S_6$. The third stationary contact is connected through a capacitor $C_{20}$ to point A of FIGURE 3. The movable contact of Switch $S_6$ is connected to junction point 93a of a four diode full wave rectifier bridge including diodes $D_{15}$, $D_{16}$, $D_{17}$ and $D_{18}$. The opposite junction of the bridge is grounded as shown. A DC meter 73 is connected between junction point 93b and junction point 93d through resistor $R_{51}$ and either variable resistor $R_{53}$ or $R_{55}$ depending on the position of switch $S_6$. Resistor $R_{57}$ and capacitor $C_{21}$ provide damping for the meter 73. The input capacitors $C_{18}$, $C_{19}$ and $C_{20}$ in combination with the resistances $R_{51}$, $R_{53}$ and $R_{55}$ and the internal meter resistance act to differentiate either the square wave signal in lead 91 from the transformer 61 or the rectangular wave from the one shot multivibrator 27, FIGURE 3, appearing at point A. The rectifier bridge comprising the diodes $D_{15}$ to $D_{18}$ rectifies the differentiated signal and the DC meter 73 will indicate the frequency of the signal from transformer 61 or multivibrator 27.

Variable resistors $R_{53}$ and $R_{55}$ provide for adjusting the input to meter 73 to give a proper reading when a signal having a known frequency is fed to the same. The capacitors $C_{18}$ and $C_{19}$ provide two ranges of full scale meter reading. Thus if $C_{18}$ is one-half the value, i.e., .01 m.f., of $C_{19}$, i.e., .02 mf., then the full scale reading of frequency meter 73 with switch $S_6$ connecting the meter circuit to $C_{18}$, will be twice that as when connected to $C_{19}$. When the analyzer is used to analyze vibrations of rotating parts, the meter 73 will read r.p.m. as well as frequency.

Operation

While the subject analyzer could be used to analyze the various frequency components of any complex signal, the operation of the analyzer will be explained by describing its use in analyzing the various speed related vibrations of an internal combustion engine and its accessories. Referring again to the block diagram of FIGURE 1, the vibration pickup 1 would be connected at some suitable point of the engine. If the amplitude meter 67 were to be used to indicate actual displacement, a known unbalance producing a known vibration displacement would be used to calibrate the analyzer. If it is merely desirable to determine what engine component is producing an undesirable vibration and what is its relative amplitude with respect to other vibrations, then the pickup 1 could be positioned at any point subject to the vibrations. When the engine is in a vehicle the pickup could be placed on the chassis, the body, but preferably on the engine itself.

A sync or reference pickup, not shown, would be connected to sync input contact 21. This pickup could either be an ignition pickup connected to two ignition wires leading to spark plugs firing 360 engine degrees apart or to a magnetic or photocell pickup producing a pulse each engine revolution, or any other means providing one pulse per engine revolution.

The complex vibration signal from pickup 1 is attenuated by adjustment of switch $S_1$. With switch Sa in the position shown in FIGURE 1, the signal will be fed to the amplifier 9 where it is amplified and fed to the integrator 11. The integrator 11 changes the complex signal produced by a velocity type pickup to that produced by a displacement type pickup. In other words, the amplitude of the signal after it leaves integrator 11 will be proportional to the amplitude of displacement of the pickup 1. This complex signal is further amplified and is applied to both synchronous rectifier bridge demodulator 17 and 19 through transformer 15.

The reference or sync pulse at 21 is connected by switch Sb to the pulse shaping amplifier 25 which produces one sharp positive pulse each engine revolution. This pulse is connected to trigger the one shot multivibrator 27 which provides a constant width rectangular wave having the same frequency as the reference input at 21. The buffer amplifier and clamping circuit 29 changes the reference level for this rectangular signal so as to provide a negative DC signal whose value is proportional to the frequency of the rectangular waveform and hence signal at 21. A percentage or portion of this DC signal as determined by the setting of switch $31a$–$31b$ and the variable resistors $33a$ to $33f$ is fed to the ripple cancelling circuit 35 and filter circuit 36 and then to the DC amplifier 37. The DC amplifier 37 provides a positive DC signal whose value is both proportional to the engine r.p.m. and to the speed ratio of the engine to that part whose vibration is being measured. This value may be visually indicated at each setting of the switch $31a$–$31b$.

The DC output from amplifier 37 is fed to the frequency controlled oscillator 39 which produces a square wave whose frequency is linearly proportional to the value of the DC input to the oscillator. This square wave signal is amplified by the push-pull amplifier 41 and fed to the primary of transformer 43. The secondary of 43 is connected across the bridge 19 to cause synchronous rectification of the complex vibration signal fed to the bridge 19. The center tap 45 of the transformer 43 will then have an output determined by the phase relationship between the square wave output from oscillator 39 and the component of the complex vibration signal whost frequency is equal to that of the square wave.

FIGURE 7 illustrates how the synchronous rectifier bridges 17 and 19 operate to separate a selected frequency F from two other frequencies 1.5F and .75F. The square wave 95 at $a$ represents the switching action of the synchronous rectifier. When the square wave is phased as shown with the selected frequency component 97 of the complex signal the rectified output appears as the wave 99 in $b$ which has an average positive DC value 101. Frequency 1.5F is scrambled by the rectifier action in such a manner as seen in $c$ that its average DC value is zero. Areas above and below the center line exactly cancel each other. Similarly, frequency .75F is also rectified to produce an average DC output of zero. Essentially all frequencies other than F and odd harmonics of F are cancelled out by the synchronous rectifier action.

FIGURE 8 illustrates how the feed back from bridge 19 acts to control the phase of the rectifying square wave produced by the oscillator 39 until the square wave and selected frequency component are 90 degrees out of phase. If the output from bridge 19, at the center tap 45, is as shown at $b$, a positive DC signal is fed to the oscillator which momentarily slightly raises the frequency output until the square wave controlled rectification of the selected frequency component produces a bridge output as shown in $d$. If the feed back from bridge 19 is like the waveform of FIGURE 8($f$) a negative signal is fed back to be added to the input to oscillator 39 to momentarily slightly decrease the frequency output of the same until the FIGURE 8($d$) or zero average DC output is attained. When the square wave output 40 from oscillator 39 is locked in 90 degrees out of phase with the selected frequency component, the square wave output 58 from the phase shifting and squaring system including 53, 55, 57 and 59, will act through demodulator bridge 17 to rectify the selected frequency component to produce the wave form shown in FIGURE 8($b$). The average value of this positive DC voltage is proportional to the amplitude of the selected frequency only and is what is shown on the amplitude meter 67.

The frequency of the selected frequency component is indicated by the meter 73 which measures the frequency of the rectifying square wave from the push-pull amplifier 59. The meter 73 is normally calibrated in cycles per minute. This selected frequency bears a certain ratio to the frequency output of the one shot multivibrator 27. This ratio is determined by the setting of whatever voltage dividing resistor $33a$ to $33f$ is connected by switch 31 to the DC amplifier. The frequency output of the one shot multivibrator 27 can be checked by switching the rectangular wave output at point A to the frequency meter rectifier 71. This is accomplished by switch $S_6$.

Since the frequency of the output of multivibrator 27 is equal to the sync input frequency at 21, the meter 73 will then also give the frequency of the reference or sync signal, which in the case of an engine vibration application is equal to the r.p.m. of the engine. Thus if the engine is operating at 1800 r.p.m. the meter will read 1800 cycles per minute or 30 cycles per second. The oscillator output frequency is calibrated by selection of its frequency determining component as well as the fixed amplification of the DC amplifier 37 to provide an output having a one-to-one frequency ratio with respect to the sync signal when one tenth of the value of the DC from circuit 29 is applied to the DC amplifier. Therefore if $33a$ is a ten turn potentiometer that is calibrated from 0 to 10, and the ratio selector switch 31 connects the output of circuit 29 to the DC amplifier 37 through the potentiometer $33a$, the frequency of the square wave output of oscillator 39 will bear the ratio to the frequency of the sync signal applied at 21 numerically equal to the setting of the 0–10 potentiometer $33a$. Thus if the sync signal is 1800 cycles per minute and the ratio dial of potentiometer $33a$ is set for 0.5, the output frequency of the oscillator 39 will be 900 cycles per minute or 15 c.p.s. Similarly if the ratio dial is set for 2.5 then the oscillator 39 will provide an output of 2.5×1800 or 4500 cycles per minute. As the frequency of the sync input to 21 changes with engine speed changes, the frequency output of oscillator 39 will change proportionally but will always bear the same ratio to the sync input unless the ratio dial $33a$ is changed.

The other positions of $31b$ will connect the DC output from circuit 29 to the DC amplifier 37 through any of the other voltage dividers 33b to 33f. These can be previously set to provide fixed ratios. For example, if the engine fan is driven at 0.9 times the engine speed, resistor 33b could be set to provide 0.09 of the DC output from 29 to the DC amplifier. Then when ever it is desired to determine the amplitude of vibration of the engine fan, the switch 31a–31b can be switched to connect 33b into the circuit and the oscillator 39 will adjust its frequency output supplied to the bridges 17 and 19 so that only vibrations occurring at a frequency 0.9 times engine speed will have their amplitude indicated on meter 67.

Likewise if the generator runs at 2.3 times engine speed, 33c could be set to provide 0.23 or 23% of the reference DC voltage to the amplifier 37. Again with switch 31 connected to 33c only vibrations occurring at 2.3 times engine speed would be indicated on meter 67. In the same manner 33d could be set to the cam shaft frequency, 33e at the power steering pump frequency, etc.

In the position shown, the sync selector switch S with its three decks Sa, Sb and Sc will connect the vibration signal from the external pickup to amplifier 9 and the sync signal to the pulse shaping amplifier 25 as shown. Sc does not connect to anything in this position. In FIGURE 3 this position of switch S corresponds to the "Use Ext" position.

If switch S is moved to the "Use Line" position deck Sc will connect pulse shaping amplifier to a line or 60 cycle voltage source to cause the one shot multivibrator to produce a 60 c.p.s. or 3600 c.p.m. output. If $S_6$ is then set to feed the output of multivibrator 27, point A, to the meter 73, then the meter should read 3600. With the sync selector switch in the "Use Line" position the deck Sa still feeds the external vibration signal to the voltage amplifier 9. This allows use of the analyzer when no external sync signal is available. The filtering frequency is set as a ratio to line frequency (3600 c.p.m.) by the ratio dial 33a.

If the sync selector switch S is moved to its "Cal RPM" position Sc feeds a 60 cycle signal to the pulse shaping amplifier 25 to drive or trigger one shot multivibrator 27 to provide a rectangular 60 c.p.s. output for controlling the internal oscillator 39. Deck Sa simultaneously connects the voltage amplifier 9 to this 60 c.p.s. output via a lead 103. When the oscillator 39 locks on this signal, with the ratio dial 33a switched in and set for 1, the r.p.m. meter should read 3600 both when $S_6$ is set for reading the frequency output of multivibrator 27 or when set for reading the square output of amplifier 59 (internal oscillator frequency). $R_{53}$ in the frequency meter circuit shown in FIGURE 5 can be adjusted to make the meter 73 read 3600 if it does not with S in "Cal RPM" position.

The fourth position of the sync selector switch S is the "Ext-Cal Dial" position as seen in FIGURE 3. With S in this position the output from the neon tube oscillator circuit 24 is fed to the vibration signal amplifier 25. This neon oscillator would normally be designed to provide a relatively low frequency output for example 8 to 10 c.p.s. equivalent to 480 to 600 r.p.m. The output from the one shot multivibrator 27 is connected by deck Sa to the vibration voltage amplifier 9. When the ratio dial 33a is set for one-to-one ratio, the oscillator should lock on this signal.

The amount of signal from the bridge 19 that is fed back to control the phase of oscillator 39 can be varied by the potentiometer 47. With too little feed back, the pointer on the amplitude meter 67 will oscillate at a frequency equal to the difference between the oscillator and component frequencies. With too much feed back the oscillator may not lock in on the smaller of two components close together in frequency. Thus 47 would be adjusted to feed just enough signal back to cause the oscillator to lock in with the component being measured.

The amplifier overdriven neon light Ne1 will indicate that the vibration signal from pickup 1 is too large. In such a case the switch $S_1$ can be turned to feed a smaller part of the vibration signal to the voltage amplifier 9 and hence give a larger full scale reading on the amplitude meter 67.

It will be seen from the above that we have provided a method and apparatus for analyzing complex waveforms and determining the amplitude and frequency of sinusoidal components of the signal that are very close together. A minimum amount of experience is needed for operating the apparatus since there is no extended calibration necessary each time the apparatus is used.

By merely positioning a vibration pickup and making two connections to the engine ignition system only simple switching from one preset frequency ratio to another will provide a complete analysis of component vibrations in an engine assembly. This whole procedure can be accomplished in a matter of a few minutes. After determining that a component is causing excessive vibration, it can either be corrected or replaced.

Other uses as well as modifications will be apparent to those skilled in the art. Such uses and modifications and other changes are deemed to be within the scope of the invention which is limited only by the following claims:

What is claimed is:

1. Vibration analyzer apparatus comprising vibration pickup means for developing a complex electrical vibration signal having combined frequency components each bearing a fixed frequency ratio to the speed of a rotating member, means for producing an electrical pulse for each revolution of the rotating member, frequency responsive means connected to the pulse producing means for deriving a variable electrical signal varying with changes in the repetition frequency of the electrical pulses, signal ratio control means having the variable electrical signal applied thereto to produce a variable and determinable portion of the variable electrical signal wherein the signal portion is proportional to the fixed frequency ratio of one of the frequency components of the complex electrical vibration signal, variable frequency oscillator means connected to the signal ratio control means and responsive to the signal portion for producing an oscillator output signal having a frequency equal to the one vibrational frequency component, a pair of synchronous rectifier circuits operatively connected to the vibration pickup means, amplifier means connected to the output of the oscillator and applying a first synchronous control signal to one of the synchronous rectifier circuits to control the rectification of the complex signal being applied thereto from the pickup means, circuit means providing a portion of the output of the one synchronous rectifier circuit to the variable oscillator input to vary the phase of the oscillator output signal relative to the phase of the one vibrational frequency component so that a predetermined phase relationship is maintained therebetween when the one synchronous rectifier has a zero average DC output signal, a control signal source supplying the output of the oscillator to the other of the synchronous rectifiers to provide a second synchronous control signal having the same frequency as the signal output of the oscillator and a phase displaced 90 degrees from the oscillator output signal, and measuring means connected to the output of the other synchronous rectifier and responsive to the second synchronous control signal for indicatig the amplitude of the one vibrational frequency component.

2. Vibration analyzer apparatus including vibration pickup means for developing a complex electrical vibration signal having combined frequency components each bearing fixed ratios to the speed of a rotating member, means responsive to the rotation of the member to provide a variable DC signal varying with changes in the rotational speed of the member, a pair of phase sensitive synchronous rectifier circuits operatively connected to the vibration pickup means, a signal ratio control means having applied thereto the variable DC signal and producing a variable and determinable portion of the variable DC signal wherein the signal portion is proportional to the fixed frequency ratio of one of the frequency components of the complex vibration signal, oscillating circuit means having a variable frequency output and an input connected to the signal ratio control means to provide an oscillating circuit means output signal having a frequency equal to the one vibrational frequency component, circuit means connecting the output of the oscillating means to one of the synchronous rectifiers to control the rectification of the complex electrical signal being applied thereto from the pickup means, the one synchronous rectifier circuit providing a rectifier output signal connected to the input of the oscillating circuit means to vary the phase of the oscillating circuit output relative to the phase of the one vibrational frequency component so that a predetermined phase relationship is maintained therebetween when the one synchronous rectifier has a zero average DC output signal, phase shifting and waveforming circuit means connecting the output of the oscillating circuit means to the other of the synchronous rectifier circuits to provide a synchronous control signal having the same frequency as the output of the oscillating means and phase displaced 90 degrees from the oscillating circuit output, and measuring means connected to the output of the other synchronous rectifier and responsive to the synchronous control signal for indicating the average DC quantity of the rectified waveform output produced by the other synchronous rectifier wherein the average DC quantity corresponds to the amplitude of the one vibrational frequency component.

3. Vibration analyzer apparatus comprising a vibration pickup means for developing a complex electrical vibration signal having combined frequency components each bearing a fixed frequency ratio to the speed of an assembly having a plurality of members each rotating at a speed having a predetermined ratio relative to the speed of a main rotating member, means for producing an electrical reference pulse for each revolution of the main member, circuit means connected to the reference pulse producing means to provide a variable DC signal varying with changes in frequency of the electrical reference pulses, a pair of phase sensitive synchronous rectifiers operatively connected to the vibration pickup means, a variable frequency oscillator, a signal ratio control means connected between the circuit means providing a variable DC signal and the variable frequency oscillator to alter the variable DC signal and produce a variable and determinable portion of the DC signal to the oscillator to cause the frequency of the oscillator output signal to equal the frequency of one of the vibrational frequency components, circuit connecting means applying the output signal of the oscillator to one of the synchronous rectifiers to control the rectification of the complex electrical vibrational signal being applied thereto, the one synchronous rectifier circuit providing a rectifier output signal connected to the variable frequency oscillator input through a circuit means to vary the phase of the oscillator output signal relative to the phase of the one vibrational frequency component so that a predetermined phase relationship is maintained therebetween when the one synchronous rectifier has a zero average DC output signal waveform, phase shifting and waveforming circuit means connecting the output of the oscillator to the other of the synchronous rectifiers to provide a synchronous control signal thereto having the same frequency as the output signal of the oscillator circuit and phase displaced 90 degrees from the oscillator signal output, measuring means connected to the output of the other synchronous rectifier and responsive to the synchronous control signal for indicating the average DC quantity of the rectified waveform output produced by the other synchronous rectifier wherein the average DC quantity corresponds to the amplitude of the one vibrational component.

4. The apparatus of claim 3 wherein the signal ratio control means includes a variable voltage divider means having an indicating means operably connected to the voltage divider means to directly indicate the portion of the variable DC signal supplied to the oscillator.

5. The apparatus of claim 3 wherein the signal ratio control means includes a plurality of selectable voltage divider circuits providing selective portions of the variable DC signal supplied to the oscillator, the voltage divider circuits providing a predetermined signal ratio proportional to the ratio of the rotational speed of each of the plurality of members to the speed of the main member, and a switch for selectively and operatively connecting the voltage divider circuits into the circuit of the signal ratio control means.

6. The apparatus of claim 3 wherein a frequency measuring and indicating means are provided and a selective connecting means which connects the electrical reference pulse or a signal having the same frequency as the oscillator output signal to the frequency means thereby providing means for measuring the frequency of the oscillator output or the electrical reference pulse.

7. Vibration analyzer apparatus including vibration pickup means for developing a complex electrical vibration signal having combined frequency components each bearing fixed ratios to the speed of a rotating member, means for producing an electrical reference pulse for each revolution of the rotating member, one-shot multivibrator means connected to the reference pulse producing means and responsive to the electrical reference pulses to produce a rectangular wave output pulse having a fixed pulse width, rectifier means connected to the rectangular wave pulse output to provide a variable DC signal varying with changes in the frequency of the electrical reference pulses, a pair of phase sensitive synchronous rectifiers, transformer means operatively connecting the vibration pickup means to each of the synchronous rectifiers, a free running multivibrator oscillator, signal ratio control means connected to the rectifier means to alter the variable DC signal and produce a variable and determinable portion of the variable DC signal, the signal portion being supplied to the free running multivibrator to cause the frequency of the multivibrator oscillator output signal to correspond to the frequency of one of the frequency components of the complex vibrational signal, transformer means connecting the output of the free running multivibrator oscillator to one of the synchronous rectifiers thereby providing a signal to control the rectification of the electrical vibration signal being applied thereto, circuit means connecting the rectified output of the one synchronous output rectifier to the input of the free running multivibrator oscillator to vary the phase of the oscillator output signal relative to the phase of the one frequency component of the complex electrical vibration signal so that a predetermined phase relationship is maintained therebetween when the one synchronous rectifier has a zero average DC output signal, phase shifting and waveforming circuit means connecting the output of the free running multivibrator oscillator to the other of the synchronous rectifiers to provide a synchronous control signal in the form of a square wave having a frequency equal to the oscillator output frequency and a phase displaced 90 degrees therefrom, and measuring means connected to the output of the other of the synchronous rectifiers and being responsive to the synchronous control signal for indicating the average DC quantity of the waveform output produced by said other of the synchronous rectifiers wherein the average DC quantity corresponds to the amplitude of the one vibrational frequency component.

8. Waveform analyzer apparatus for analyzing a complex electrical signal having combined frequency components each having a certain ratio to the frequency of the system generating the complex electrical signal including; means generating a first square wave signal having a frequency proximate to the frequency of a selected component whose amplitude is to be measured, the first square wave generating means including means producing a synchronizing signal having a certain frequency relation to the speed of the system and control means operative to modify the synchronizing signal so as to develop the square wave signal of the frequency corresponding to that of the selected component, first phase sensitive rectifier means having the complex electrical signal applied thereto, circuit means connecting the square wave generating means to the first phase sensitive rectifier means to provide thereto a signal to control the rectification of the complex signal, feedback means connecting the output of the first rectifier means to the square wave generating means to vary the phase of the generating means output relative to the phase of the complex signal frequency component being measured whereby the first rectifier means is controlled to maintain a zero average DC output signal and the square wave generating means will lock-in on the frequency of the selected component, means for generating a second square wave signal having a phase displaced 90 degrees from the phase of the first square wave signal and having the same frequency as the first square wave signal, second phase sensitive rectifier means responsive to the complex electrical signal the second square wave signal also being applied to the second phase sensitive rectifier means to provide a control signal so that the complex signal is rectified in accordance with the second square wave signal, and measuring means connected to the output of the second rectifier means to indicate the average of the DC signal produced by the second rectifier means wherein the second rectifier output signal corresponds to the amplitude of the frequency component being measured.

9. The apparatus of claim 8 including frequency measuring and indicating means to provide an indication of the frequency of the output signal from one of the square wave generating means.

10. Waveform analyzer apparatus for analyzing a complex electrical signal having combined frequency components each having a certain ratio to the frequency of the system generating the complex electrical signal including means for generating a first square wave electrical signal having approximately the frequency of a selective component whose amplitude is to be measured, the first square wave generating means including means producinga a synchronizing signal having a certain frequency relation to the speed of the system and control means operative to modify the synchronizing signal so as to develop the square wave signal of the frequency corresponding to that of the selected component; phase sensitive rectifier means including a rectifier bridge circuit having four diodes connected in a series loop and forming four junctions between each of the diodes, a first transformer means including a first winding being connected to the complex electrical signal and a second winding connected across two opposite junctions of the bridge circuit, a second transformer means including a first winding connected to the first electrical square wave signal generating means and a second winding connected across the other two opposite junctions of the bridge circuit to connect the first electrical square wave signal generating means to the bridge circuit and to control rectification of the complex electrical signal, each of the second windings of the first and second transformer means having center taps providing a rectified output signal to the square wave signal generating means to vary the phase of the generating means output relative to the phase of the complex signal frequency component being measured so that a predetermined phase relationship is maintained therebetween when the rectifier signal output of the rectifier means has a zero average DC signal and the square wave generating means will lock-in on the frequency of the selected component so as to generate a square wave signal of the same frequency as the selected component; means for generating a second square wave 90 degrees out of phase with the first square wave signal and having the same frequency as the first square wave signal, a second phase sensitive rectifier means including a rectifier bridge circuit comprising four diodes connected in a series loop and forming four junctions between each of the diodes, the first transformer second winding being connected across two opposite junctions of the second bridge to connect the complex electrical signal to the second bridge, third transformer means including a first winding connected to the second square wave generating means and a second winding connected across the other two opposite junctions of the second bridge, the third transformer second winding having a center tap providing with the center tap of the first transformer the output of the second bridge, and means for measuring the average DC signal output of the second bridge and accordingly the amplitude of the one frequency component of the complex electrical signal being measured.

11. A vibration analyzer for analyzing mechanical vibrations as a function of the speed of rotation of a rotating member in a vibration producing apparatus comprising, means for converting the mechanical vibrations into a complex electrical signal, electrical filter means having the complex electrical signal applied thereto and being responsive to the complex electrical signal to separate a certain frequency component therefrom wherein the frequency component is related to a mechanical vibration selected for analysis, the filter means including a synchronous rectifier circuit means for synchronously rectifying the complex signal, means responsive to the speed of rotation to develop a control signal having a controllable frequency that varies with changes in the speed of rotation of the rotating member, the speed responsive means supplying the controllable frequency control signal to the synchronous rectifier circuit, manually controllable signal proportioning means to proportionately vary the controllable frequency control signal as a variable and determinable ratio of the speed of the rotating member, phase and frequency control means providing a feedback signal to the speed responsive means from the filter means for varying the phase of the control signal and thereby establishing a certain phase relationship between the rectified output produced by the synchronous rectifier circuit and the certain frequency component of the complex electrical signal so as to coincide the frequency of the control signal with the frequency of the certain frequency component, and measuring means to indicate the relative amplitude of the certain separated frequency component wherein the frequency of the component is equal to the frequency of the control signal and the relative amplitude indicated by the measuring means is maintained at a maximum by the phase control means maintaining a predetermined phase relationship between the control signal and the certain separated frequency component, whereby the indicated amplitude of the frequency component is also an indication of the selected mechanical vibration being analyzed.

12. A vibration analyzer for analyzing mechanical vibrations as a function of the speed of rotation of a rotating member in a vibration producing apparatus comprising, means for converting the mechanical vibrations into a complex electrical signal, electrical filter means having the complex electrical signal applied thereto separate a certain frequency component therefrom which is related to a mechanical vibration selected for analysis, the filter means including a synchronous rectifier circuit means for synchronously rectifying said signal at a controllable frequency supplied by a control signal, oscillator means to produce a periodically varying control signal having an output frequency that varies in response to changes in speed of the rotating member of the vibration producing apparatus, means connecting the oscillator to the rectifier circuit means to apply the control signal thereto, manually controllable signal ratio control means controlling the frequency of the control signal as a variable and determinable ratio of the speed of rotation of the rotating member, phase and frequency control means providing a feedback signal to the oscillator means from the filter means for varying the phase of the periodically varying control signal relative to the phase of the certain separated frequency component of the complex electrical signal thereby establishing a certain phase relationship between the rectified output produced by the synchronous rectifying circuit and the certain frequency component during the rectification of the complex electrical signal by the filter means so as to lock in the oscillator means on the frequency of the certain frequency component and coincide the frequency of the periodically varying control signal therefrom with the frequency of the certain frequency component, means for indicating the relative amplitude of the certain separated frequency component when the frequency of the frequency component is equal to the frequency of the control signal and the indicated relative amplitude is maintained at a maximum indication by the phase control means maintaining a predetermined phase between the control signal and the certain separated frequency component whereby the indicated relative amplitude is an indication of the amplitude of the selected mechanical vibration being analyzed.

13. Apparatus for analyzing the vibration characteristics of selected parts of a rotating system comprising vibration pickup means for developing a complex electrical vibration signal having combined frequency components each representing the speed of one of the parts and each having a fixed frequency ratio to the speed of a rotating system, means producing a synchronizing signal having a certain frequency relation to the speed of the system, control means operative to modify the synchronizing signal so as to develop a modified signal of a frequency corresponding to that of the frequency component of the part selected to have the vibrations thereof analyzed, the control means being infinitely variable over a predetermined range so that any frequency component within the predetermined range can be analyzed, means mixing the complex signal and the modified signal so as to develop a certain output when the component corresponding to the rotational velocity of the selected part is isolated, feedback means supplying a feedback signal reflecting the output from the mixing means to the control means so as to cause the modified signal to be altered until the frequency of the modified signal coincides with the frequency of the selected frequency component, and means measuring the component so as to permit an analysis thereof.

14. The apparatus described in claim 13 wherein the control means includes a manually variable frequency altering network for changing the frequency of the synchronizing signal so as to develop a modified signal of a frequency corresponding to that of the frequency component of selected different ones of the parts and means developing a pair of 90 degree phase displaced modified signals, wherein the mixing means is a pair of demodulators, one for each of the pair of modified signals, and wherein the measuring means is coupled to both of the demodulators and adapted to measure the frequency and also the amplitude of the frequency component of the selected part.

15. Apparatus for analyzing the vibration characteristics of selected parts of a rotating system comprising vibration pickup means for developing a complex electrical vibration signal having combined frequency components each representing the speed of one of the parts and each having a fixed frequency ratio to the speed of a rotating system, means producing a synchronizing signal having a certain frequency relation to the speed of the system, control means operative to vary both the phase and the frequency of the synchronizing signal and develop therefrom a modified signal, means mixing the complex signal and the modified signal so as to develop a certain output when the component corresponding to the rotational velocity of the selected part is isolated, feedback means supplying a feedback signal reflecting the output from the mixing means to the control means so as to cause the modified signal to be of a frequency coinciding with the frequency component of the part selected to have the vibrations thereof analyzed and of a predetermined phase relationship with the frequency component so as to cause the mixing means to develop the certain output, and means measuring the component so as to permit an analysis thereof.

16. Apparatus for analyzing the vibration characteristics of selected parts of a rotating system comprising vibration pickup means for developing a complex electrical vibration signal having combined frequency components each representing the speed of one of the parts and each having a fixed frequency ratio to the speed of a rotating system, means producing a synchronizing signal having a certain frequency relation to the speed of the system, control means operative to modify the synchronizing signal, the control means including generating means communicating with the synchronizing signal producing means and operative to develop a modified signal of a frequency determined by the input thereto, means mixing the complex signal and the modified signal so as to develop a certain output when the frequency component corresponding to the rotational velocity of the part selected to have the vibrations thereof analyzed is isolated, feedback means supplying a feedback signal reflecting the output from the mixing means to the input of the generating means so as to cause the modified signal to have a frequtncy coinciding with the frequency of the selected frequency component, and means measuring the component so as to permit an analysis thereof.

17. A method of analyzing the frequency components of a complex electrical signal developed by different parts of vibration producing apparatus including the steps of supplying said complex signal to a synchronous rectifier, providing a reference pulse having the same frequency as one of the components of said signal, converting said pulse to a DC signal having a value dependent on the frequency of said reference pulse, selecting a predetermined portion of said DC signal, said portion corresponding to the frequency component of a part whose vibrations are being analyzed, converting said DC portion to a square wave having a frequency dependent on the value of said DC signal, synchronously rectifying said complex signal with said square wave in the synchronous rectifier to filter out all frequency components except that having the same frequency as said square wave, and measuring the maximum value of the frequency component passed through the rectifier and accordingly the amplitude of the vibrations of said part.

18. Apparatus for analyzing the vibration characteristics of selected parts of a rotating system comprising vibration pickup means for developing a complex electric vibration signal having combined frequency components each representing the speed of one of the parts and each having a fixed frequency ratio to ihe speed of the system, means producing a synchronizing signal having a certain frequency relation to the speed of the system, control means operative to modify the synchronizing signal, the control means including generating means having the input thereof communicating with the synchronizing signal producing means and operative to develop a modified signal of a frequency and of a phase determined by the input thereto, means mixing the complex signal and the modified signal so as to develop an output corresponding both to the difference between the frequencies of the modified signal and a selected frequency component representative of a vibration characteristic of a selected part and to variations from a predetermined phase relationship between the modified signal and the frequency component, and feedback means supplying a feedback signal reflecting the output from the mixing means to the input of the generating means so as to cause the mixing means to develop a null output when the modified signal has a frequency coinciding with the frequency of the selected frequency component and also the predetermined phase relationship is established, and means measuring the selected frequency component so as to permit an analysis thereof.

19. The apparatus as described in claim 21 including means producing a rectifying signal 90 degrees phase displaced from the modified signal, and wherein the mixing is also operative to mix the rectifying signal and the complex signal and develop a full wave rectified output of an average DC level corresponding to that of the frequency component and accordingly representing the amplitude of the vibrations of the selected part.

References Cited

UNITED STATES PATENTS

| | | | |
|---|---|---|---|
| 2,377,349 | 6/1945 | MacKenzie | 73—71.4 X |
| 2,787,907 | 4/1957 | King | 73—462 |
| 2,552,369 | 9/1950 | Guanella | 324—77 |
| 2,947,172 | 8/1960 | King | 73—462 |
| 3,018,439 | 1/1962 | Burrow. | |
| 3,056,300 | 10/1962 | Lash et al. | 73—462 |
| 3,109,976 | 11/1963 | Sinchling | 321—4 |
| 3,277,695 | 10/1966 | Joline | 73—71.4 |
| 3,045,180 | 7/1962 | Losher | 324—77 |
| 3,054,053 | 9/1962 | Cook | 324—77 |

JAMES J. GILL, *Primary Examiner.*

UNITED STATES PATENT OFFICE
CERTIFICATE OF CORRECTION

Patent No. 3,376,733                      April 9, 1968

Philip K. Trimble

It is hereby certified that error appears in the above numbered patent requiring correction and that the said Letters Patent should read as corrected below.

Column 4, line 31, "theer" should read -- there --; line 74, "contacts" should read -- contact --. Column 5, line 6, "act a" should read -- act as --. Column 6, line 66, "$C_5$," should read -- $C_5'$ --. Column 7, line 70, "register" should read -- resistor --. Column 8, line 19, "function" should read -- function --; line 22, "inverter" should read -- inverted --. Column 9, line 14, "When" should read -- Where --; line 48, "resistords" should read -- resistors --. Column 10, line 52, "component" should read -- components --. Column 15, lines 44 and 45, "producinga" should read -- producing --. Column 16, line 63, after "thereto" insert -- to --. Column 18, line 32, "frequtncy" should read -- frequency --. Column 20, line 5, 2,552,369" should read -- 2,522,369 --; line 9, "Sinchling" should read -- Sichling --.

Signed and sealed this 2nd day of September 1969.

(SEAL)
Attest:

EDWARD M. FLETCHER, JR.            WILLIAM E. SCHUYLER, JR.
Attesting Officer                    Commissioner of Patents